Sept. 1, 1970 — M. J. WACLAWEK — 3,526,155

TRANSMISSION

Filed Dec. 19, 1968

INVENTOR
MICZYSLAW J. WACLAWEK
BY Robert H. Johnson
ATTORNEY

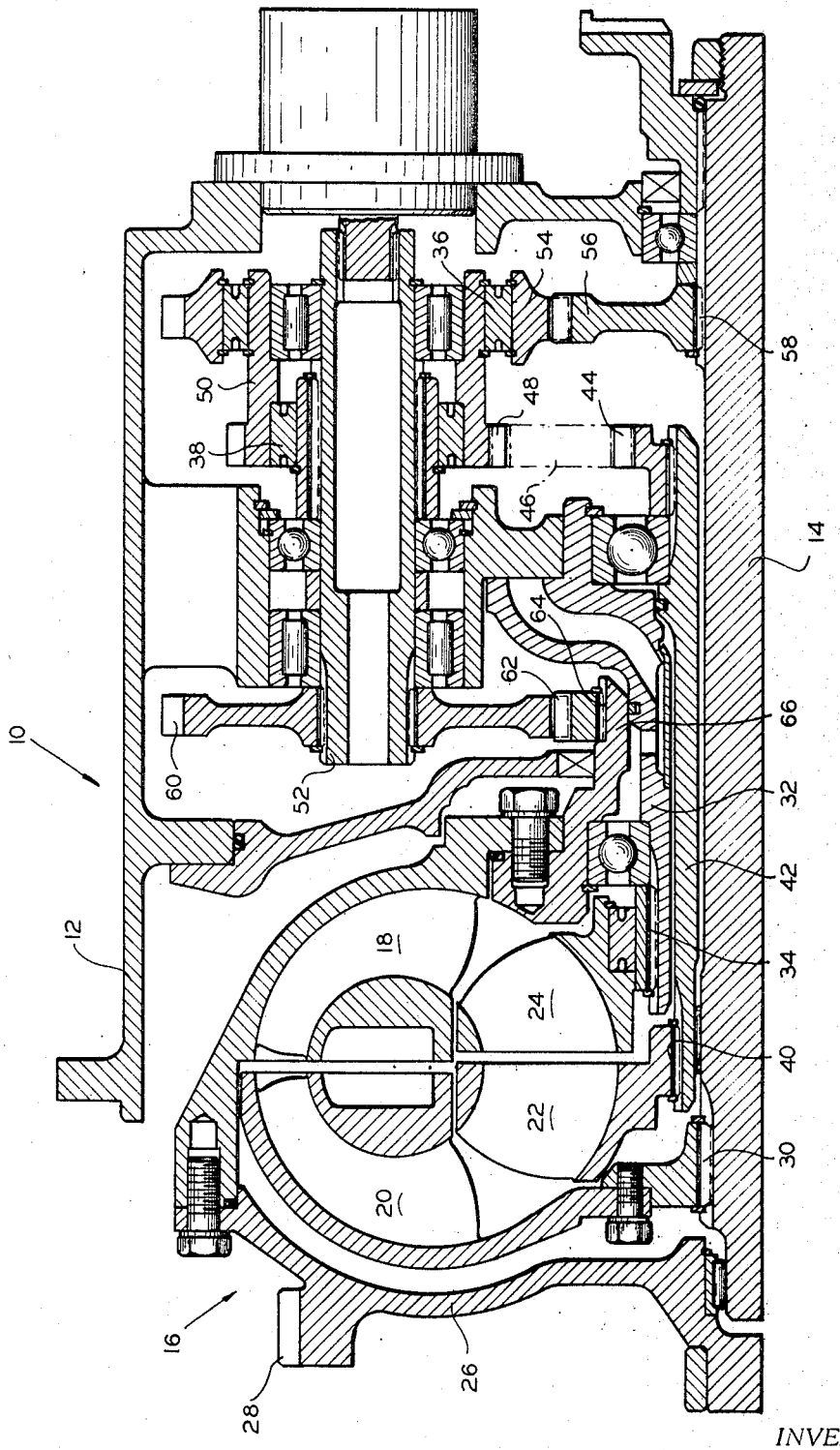

United States Patent Office 3,526,155
Patented Sept. 1, 1970

3,526,155
TRANSMISSION
Miszyslaw J. Waclawek, Burlington, Iowa, assignor to
Clark Equipment Company, a corporation of Delaware
Filed Dec. 19, 1968, Ser. No. 785,083
Int. Cl. F16h 47/00, 47/06
U.S. Cl. 74—718                                      9 Claims

ABSTRACT OF THE DISCLOSURE

A transmission including a hydrodynamic torque converter with a reactor. The reactor can be connected by gearing and a one-way clutch to an output shaft to provide in one mode of operation a split path power flow and can be connected by gearing and another one-way clutch to an impeller to provide in another mode of operation a regenerative power flow.

BACKGROUND OF THE INVENTION

The field of art to which this invention relates includes machine elements and mechanisms, and more specifically gearing in which a fluid drive divides or combines plural power paths.

An object of this invention is to provide an improved transmission that is simple in construction, has good operating characteristics and is automatic.

SUMMARY OF THE INVENTION

In carrying out my invention in a preferred embodiment, I provide a hydrodynamic torque converter with an impeller, a turbine and a reactor. The reactor can be connected by reverse gearing and a one-way clutch to drive an output shaft or connected by the reverse gearing and another one-way clutch to drive the impeller.

The above and other objects, features and advantages of my invention will be more readily understood by persons skilled in the art when the drawing is taken together with the detailed description.

BRIEF DESCRIPTION OF THE DRAWING

FIG. 2 shows on an enlarged scale the portion of FIG. 1 above the centerline.

DESCRIPTION OF THE PREFERRED EMBODIMENT

Figure 1:
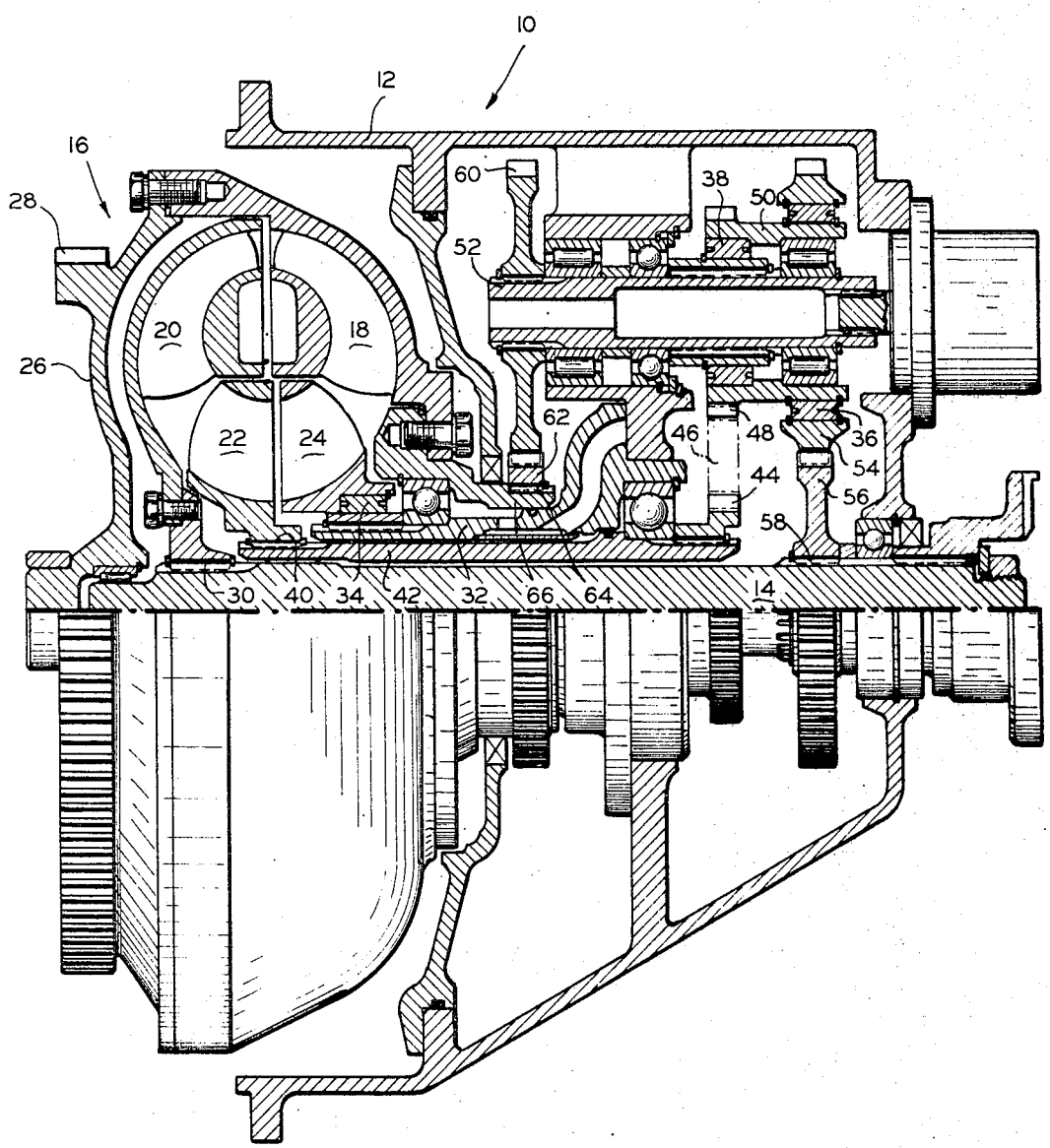
FIG. 1 is a partial longitudinal section of my invention.

Referring now to FIGS. 1 and 2, reference numeral 10 denotes generally a transmission which includes a housing 12 in which an output shaft 14 is journaled for rotation and a hydrodynamic torque converter 16 which is adapted to be driven by a prime mover, not shown.

Torque converter 16 includes an impeller 18, a turbine 20 and a pair of reactors 22 and 24. As is conventional with hydrodynamic torque converters, impeller 18, turbine 20 and reactors 22 and 24 are all bladed wheels and cooperate to form a toroidal chamber which is filled with fluid. Rotation of impeller 18 circulates the fluid in the toroidal chamber, the fluid transmitting energy from the impeller to the turbine. Impeller 18 is connected to a dish-shaped member 26 which has integral therewith a ring gear 28 that is adapted to be connected to the fly wheel of an engine. Turbine 20 is connected by means of a spline connection 30 to output shaft 14. Reactor 24 is connected to a stationary support 32 by means of a one-way brake 34 so that reactor 24 can overrun in a forward direction as the speed ratio of torque converter 16 approaches one. Reactor 22 can be connected through reverse gearing and a one-way clutch 36 to output shaft 14 to provide a split path power flow or connected through reverse gearing and another one-way clutch 38 to impeller 18 to provide a regenerative power path as will be explained in more detail below.

Reactor 22 is connected by means of a spline connection 40 to a sleeve shaft 42 which is journaled for rotation and is disposed coaxially with output shaft 14. Connected to the end of sleeve shaft 42 remote from reactor 22 is a gear 44 which forms a part of the reverse gearing. Gear 44 meshes with an idler gear 46 which in turn meshes with another gear 48 that is integral with a sleeve shaft 50 which is journaled for rotation on and coaxial with another shaft 52. Connected to sleeve shaft 50 by means of one-way clutch 36 is a gear 54 which meshes with a gear 56 fixed to output shaft 14 by means of a spline connection 58.

At this point it will be apparent that the effect of fluid impinging on reactor 22 tends to cause it to rotate in the opposite direction from the direction of rotation of impeller 18 and turbine 20 throughout most of the operational cycle of torque converter 16, and further that the reverse rotation of reactor 22 is changed through reverse gearing 44, 46 and 48 so that shaft 50 is being driven in the proper direction to cause output shaft 14 to rotate in a forward direction relative to reactor 22 through gear set 54, 56. Further, one-way clutch 36 is disposed so that shaft 50 can drive output shaft 14.

Connected to one end of shaft 52 is a gear 60 which meshes with another gear 62 that is fixed by spline connection 64 to a short sleeve shaft 66 that is connected to impeller 18 for conjoint rotation therewith. One-way clutch 38 is disposed so that shaft 50 can drive shaft 52 under certain conditions of operation.

In order to enable persons skilled in the art to more readily understand my invention, I will now explain the operation of it. It will be assumed that transmission 10 is associated with a vehicle which initially is at rest and that the prime mover associated therewith is accelerated from an idling speed to a governed operating speed. Initially, there will be a zero speed ratio between impeller 18 and turbine 20. As turbine 20 begins to rotate, together with output shaft 14, there will be a split path of power flow. Part of the power being supplied to impeller 18 from the prime mover will be transmitted to turbine 20 by the fluid in torque converter 16 and hence to output shaft 14. Another part of the power will cause reactor 22 to rotate in reverse relative to the rotation of impeller 18 and turbine 20 and through reverse gearing 44, 46 and 48 to drive shaft 50. Shaft 50 then through one-way clutch 36 and gear train 54, 56 also drives output shaft 14.

As the speed ratio of torque converter 16 increases, due to the increase in speed of turbine 20, transmission 10 will reach a point at which one-way clutch 38 will lock shaft 50 to shaft 52 for conjoint rotation therewith. Because shaft 52 is connected to impeller 18 which is being operated at a constant governed speed the coupling of shaft 50 to shaft 52 limits the maximum speed of shaft 50. Thus, as the speed of turbine 20 continues to increase one-way clutch 36 unlocks so that power from reactor 22 is now being directed through reverse gearing 44, 46, 48 to shaft 50 as before and hence through clutch 38 to shaft 52 and then to impeller 18 to provide a regenerative power flow.

As the speed of turbine 20 continues to increase past the speed at which clutch 38 couples shaft 50 to shaft 52, power from reactor 22 will continue to be directed back to impeller 18 until the speed at which reactor 22 rotates backwardly decreases to a point at which one-way clutch 38 unlocks. When this occurs reactor 22 will simply be rotating freely in the torque converter circuit, but not changing the direction of fluid flow therein. Consequently, the torque converter 16 will act as a three element torque converter with reactor 24 as the single reactor element. The operation of transmission 10 will continue with all of the power now flowing to output shaft coming from turbine 20. Finally, as the speed of turbine 20 increases further the exit angle of fluid leaving turbine 20 impinges on reactor 24 such that reactor 24 begins to overrun in a forward direction so that it no longer has any effect in the circuit and torque converter 16 functions simply as a fluid coupling.

While I have disclosed only a single preferred embodiment of my invention in the foregoing detailed description, it should be understood that this description is illustrative only and that my invention is subject to various changes and modifications without departing from the scope and spirit thereof. Consequently, the limits of my invention should be determined from the following appended claims.

What is claimed is:

1. A transmission comprising a hydrodynamic torque converter having an impeller, a turbine and a first reactor, an output shaft connected to the said turbine, first means for drivingly connecting the said first reactor to the said output shaft only and second means for disconnecting the said first reactor from the said output shaft and drivingly connecting the said first reactor to the said impeller only when a predetermined speed ratio is reached.

2. A transmission as set forth in claim 1 wherein the said first means includes reverse gearing and a first one-way clutch.

3. A transmission as set forth in claim 2 wherein the said second means includes a second one-way clutch.

4. A transmission as set forth in claim 3 wherein the said torque converter include a second reactor.

5. A transmission as set forth in claim 4 and including a one-way brake for holding the said second reactor from rotation in one direction.

6. A transmission as set forth in claim 1 wherein the said first means includes a first gear connected to the said first reactor, a rotatable sleeve shaft, a second gear fixed to the said sleeve shaft, an idler gear meshing with the said first and second gears, a third gear mounted for rotation on the said sleeve shaft, a one-way clutch for connecting the said third gear and sleeve shaft for conjoint rotation in one direction and a fourth gear fixed to the said output shaft and meshing with the said third gear.

7. A transmission as set forth in clam 2 wherein the said second means includes a rotatable shaft disposed coaxially in the said sleeve shaft, a fifth gear fixed to the said shaft, a sixth gear connected to the said impeller and meshing with the said fifth gear and a second one-way clutch for connecting the said shaft and sleeve shaft for conjoint rotation in one direction.

8. A transmission as set forth in claim 7 wherein the said torque converted includes a second reactor.

9. A transmission as set forth in claim 8 and including a one-way brake for holding the said second reactor from rotation in one direction.

References Cited
UNITED STATES PATENTS

| | | | |
|---|---|---|---|
| 2,297,259 | 9/1942 | Speiser | 74—718 |
| 2,379,015 | 6/1945 | Lysholm | 74—720 |
| 2,882,684 | 4/1959 | Kelley | 74—731 X |
| 3,102,435 | 9/1963 | Shealy | 74—718 |
| 3,105,396 | 10/1963 | Dundore et al. | 74—730 |
| 3,426,622 | 2/1969 | Tuck | 74—730 |

ARTHUR T. McKEON, Primary Examiner

U.S. Cl. X.R.

74—731